May 9, 1961 J. F. CELLA ET AL 2,983,596
BOTTLE PACKAGING MACHINE
Original Filed May 19, 1954 5 Sheets-Sheet 4
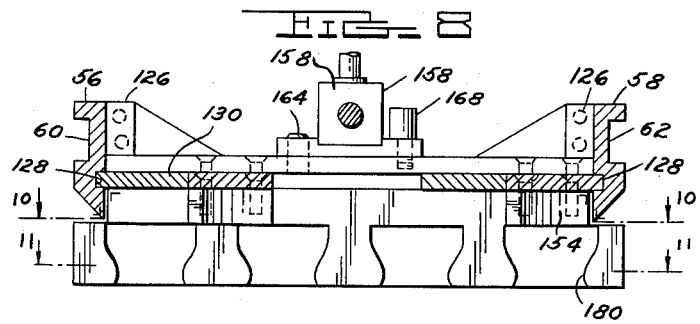
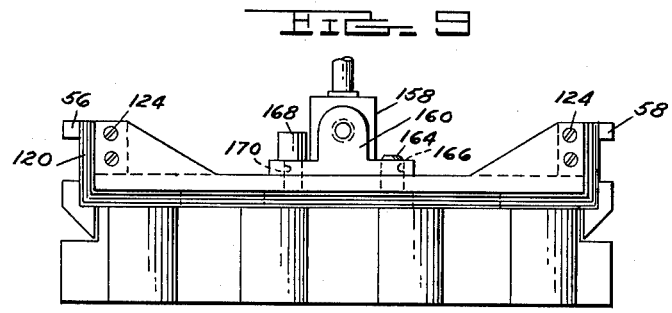
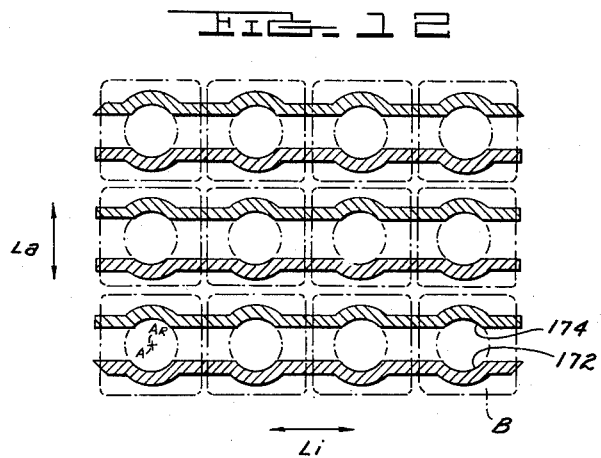
INVENTORS
JOSEPH F. CELLA
PAUL GANCIA
BY
Burton & Parker
ATTORNEY

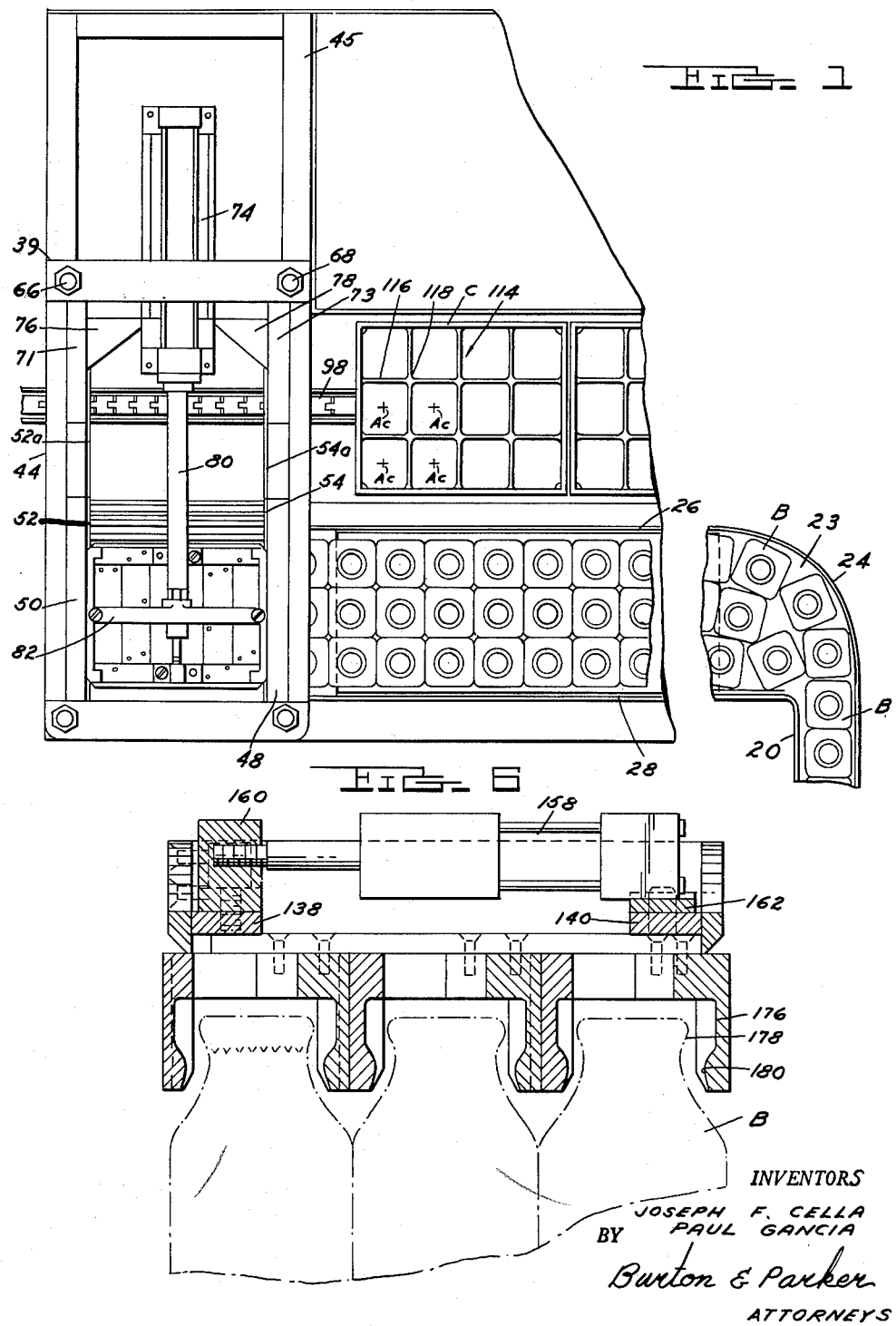

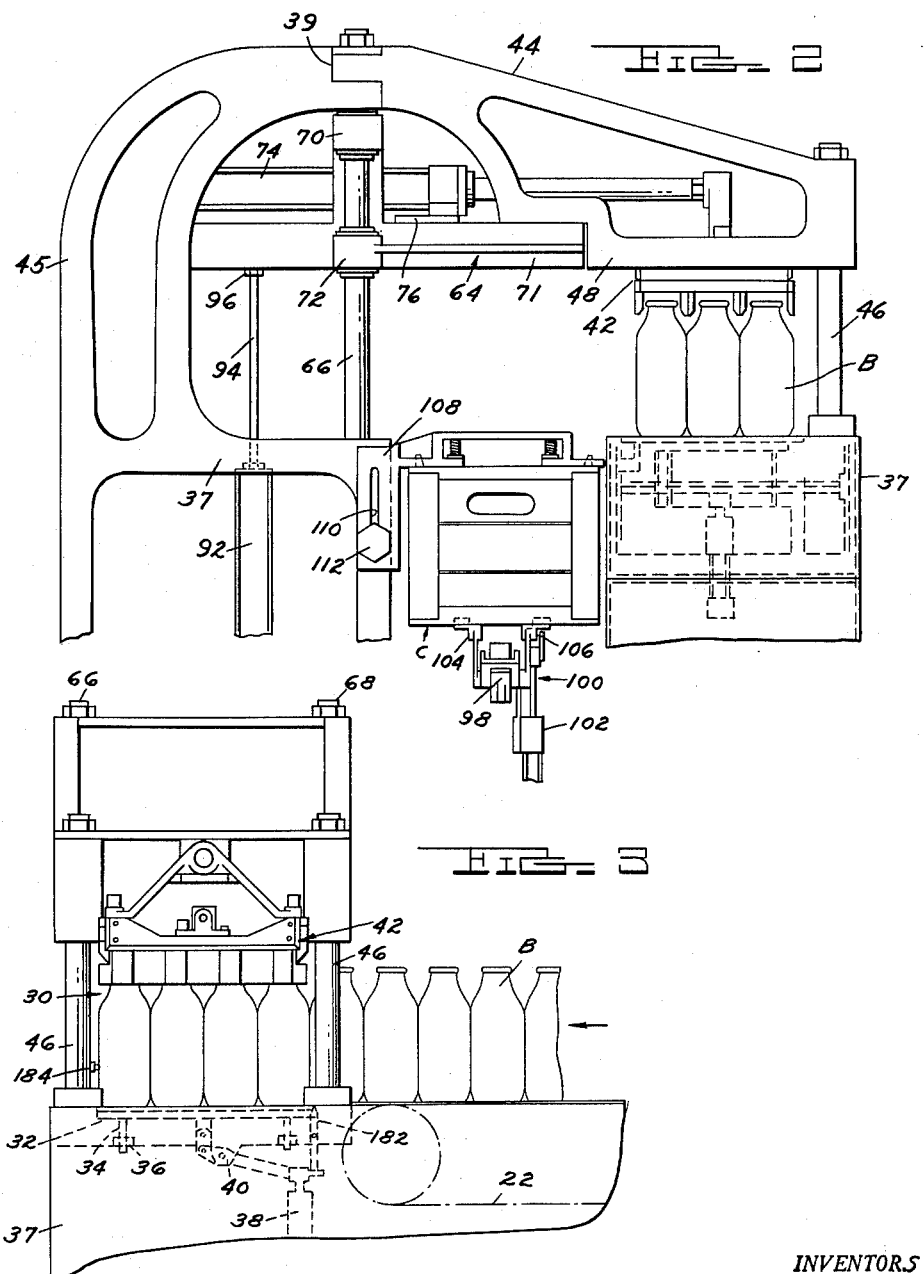

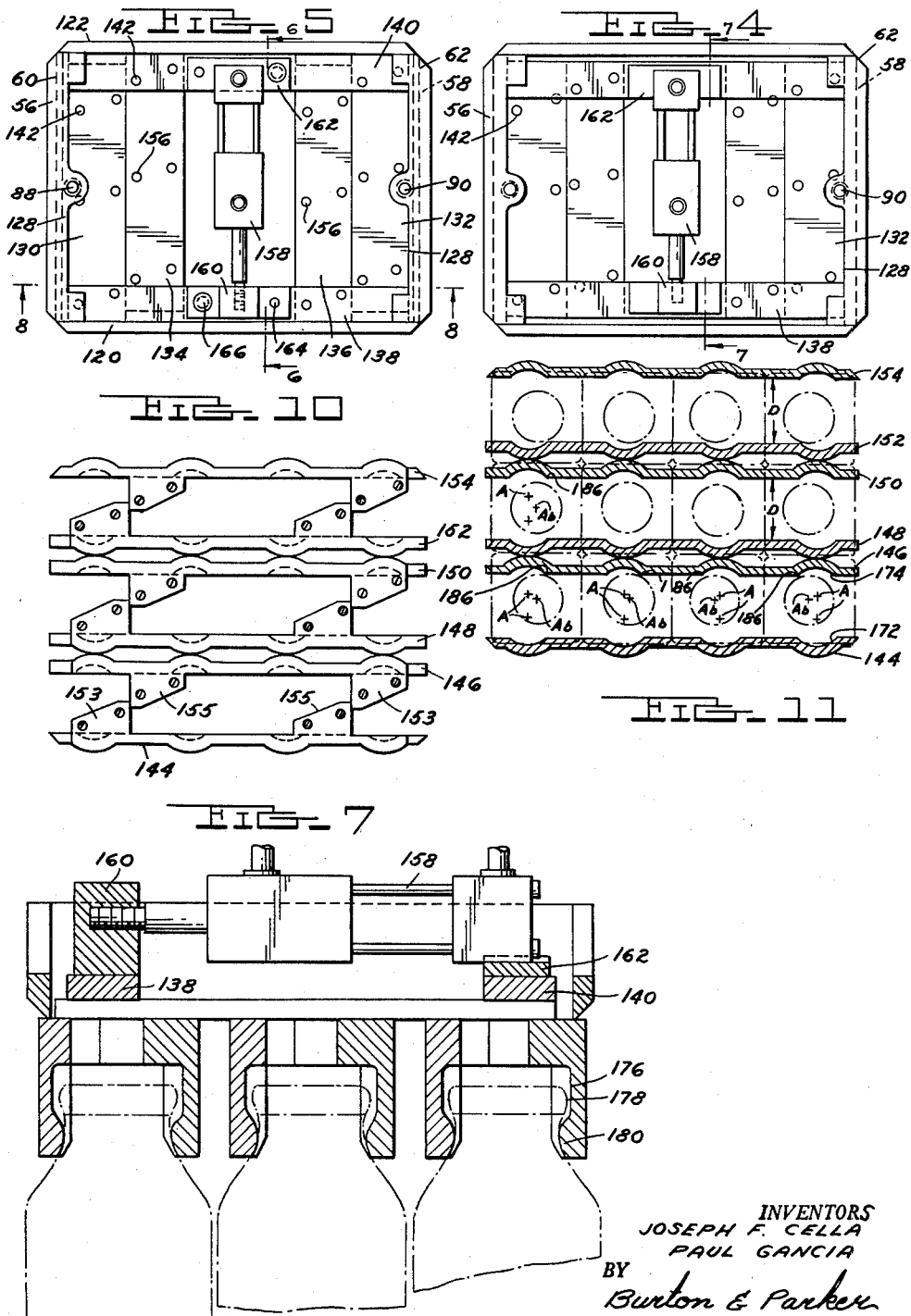

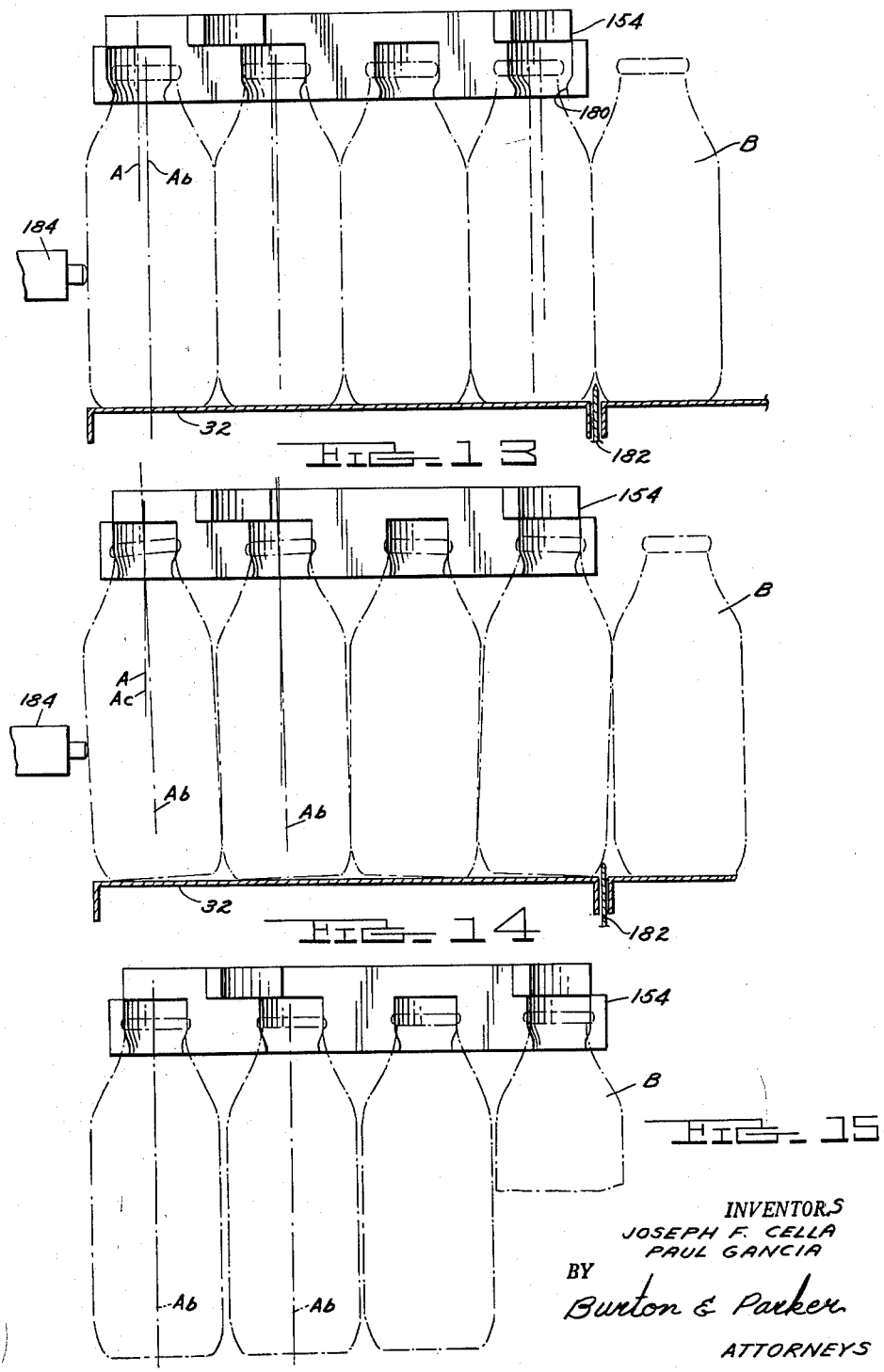

United States Patent Office 2,983,596
Patented May 9, 1961

2,983,596
BOTTLE PACKAGING MACHINE

Joseph F. Cella, Bronxville, N.Y., and Paul Gancia, Royal Oak, Mich., assignors to Cella Machinery, Inc., New York, N.Y., a corporation of New York Original application May 19, 1954, Ser. No. 417,448, now Patent No. 2,899,233, dated Aug. 11, 1959. Divided and this application Apr. 20, 1959, Ser. No. 807,532

5 Claims. (Cl. 53—26)

This invention relates generally to the art of bottle packaging and is a division of parent application Serial No. 417,448 filed March 19, 1954, now Patent No. 2,899,-233, and particularly features a method of transferring and depositing bottles or the like in cellular cases or crates.

Disclosed in copending application Serial No. 737,991, now Patent No. 2,898,716, is a machine adapted to receive a succession of bottles and a succession of crates and transfer the bottles so received to the crates. The machine includes a bottle carrier operable automatically to grip a crateload of bottles disposed in an indexing station and move the bottles while suspended from the carrier laterally and downwardly into a crate disposed in a bottle receiving position, and thereafter release the bottles and return to a position adjacent the indexing station for the cycle to be repeated.

The primary object of the invention disclosed in the instant application is the provision of an improved method for transferring a crateload of bottles from an indexing station into a cellular crate, in which method the bottles are received in the indexing station as a complete caseload being compacted together both longitudinally and transversely of the caseload and at the time of being gripped by the carrier are spaced apart by the carrier both longitudinally and transversely of the caseload, such that their relative positions match the relative positions of the cells of the case to be filled, so that the bottles are readily and easily received within the crate upon transfer thereto.

Other objects, advantages, and meritorious features will more fully appear from the following specification, appended claims, and accompanying drawings, wherein:

Fig. 1 (sheet 1) is a top view of a machine embodying the invention and showing the bottle conveyor and a crate conveyor which are adapted to convey bottles and crates into the machine, and a carrier adapted to transfer the bottles into the crates;

Fig. 2 (sheet 2) is a side elevation of the machine looking toward the left-hand side as viewed in Fig. 1;

Fig. 3 (sheet 2) is a partial elevation of the bottle indexing station showing the carrier disposed thereabove and in the position to grip the bottles in the station;

Fig. 4 (sheet 3) is a top view of the bottle carrier showing the clamping bar supports moved to a position such that the bars depending from the supports are disposed in a bottle clamping position;

Fig. 5 (sheet 3) is similar to Fig. 4 but shows the clamping bar supports moved to a position such that the bars depending therefrom are disposed in a bottle receiving position;

Fig. 6 (sheet 1) is a cross sectional view taken on line 6—6 of Fig. 5;

Fig. 7 (sheet 3) is a cross sectional view taken on line 7—7 of Fig. 4;

Fig. 8 (sheet 4) is a cross sectional view of the carrier taken on line 8—8 of Fig. 5;

Fig. 9 (sheet 4) is a detail view of the carrier as shown in Fig. 3;

Fig. 10 (sheet 3) is a cross sectional view taken on line 10—10 of Fig. 8;

Fig. 11 (sheet 3) is a cross sectional view taken on line 11—11 of Fig. 8;

Fig. 12 (sheet 4) is a cross sectional view taken on line 11—11 of Fig. 8, but showing the bottle gripping bars disposed in the bottle clamping position;

Fig. 13 is a detail elevation of the bottle indexing station as when looking in the direction of Fig. 3 (sheet 2), and showing a row of bottles just prior to being gripped by the bars;

Fig. 14 (sheet 5) is similar to Fig. 13 but showing the bottles immediately after being gripped by the bars with the bottles in the indexing station, and showing the spacing apart of the bottles at their necks; and Fig. 15 (sheet 5) is an elevation of the bottles and the bars taken in the direction of Fig. 3 (sheet 2) and showing the bottles spaced apart throughout their heights as they are carried toward the bottle crate.

As shown in Figs. 1 and 3, a plurality of bottles B are fed from a single line bottle conveyor 20 onto the conveyor 22 which moves the bottles into the machine. As the bottles leave the conveyor 20 they pass over the marshaling table 23 and abut the curved wall 24 which urges them in between the walls 26 and 28 which extend along opposite edges of the conveyor 22. The walls 26 and 28 are spaced apart a distance equalling the combined width of three rows of bottles B, compacted together as shown in Fig. 1. The cooperation of the curved wall 24 and the side walls 26 and 28 compact the bottles together as they move onto the conveyor 22. The conveyor is continuously driven as is more particularly described in our copending application, Serial No. 737,991.

As the bottles move into the machine on conveyor 22 they approach an indexing station generally indicated in Fig. 3 as 30. The station is provided with a vertically movable floor portion 32 which is adapted, when in the raised postion shown in Fig. 3, to support a crateload of compacted bottles. Four depending pins 34 extend slidably through guides 36 mounted on the framework 37 of the machine. Vertical reciprocation of the table is effected by a fluid piston-cylinder combination 38 mounted on the frame of the machine with the piston operatively coupled through linkage 40 to the underside of the table. The cylinder-piston combination is controlled through switches, hereinafter mentioned.

Supported above the indexing station for lateral reciprocable movement is a bottle carrier generally indicated as 42. The carrier is supported above the table by the bifurcated frame extension 44 coupled with a generally U-shaped portion 45 of the frame 37, as at 39, all as shown in Figs. 1, 2, and 3. Vertical posts 46 extend between the end of the frame extension 44 and the frame 37 therebelow to rigidify the extension 44. The extension 44 is provided with horizontal oppositely disposed members 48 and 50 which exhibit on opposed faces linearly extending guides 52 and 54. The frame of the carrier 42, as shown in Fig. 8, is provided with side members 56 and 58 exhibiting grooves 60 and 62 adapted to slidably receive the guides 52 and 54 respectively.

Disposed to the left of the carrier, as shown in Fig. 2, is the vertically reciprocable cross-head 64 slidably mounted upon the pillars 66 and 68 which couple the extension 44 to the frame 45 at their upper ends and are attached to the frame 37 at their lower ends. The cross-head is generally T-shaped as shown in Fig. 2, with the body of the T shape at each side of the cross-head exhibiting pillar receiving bearings 70 and 72. The arms 71 and 73 of the T-shaped cross-head exhibit on their opposed faces linearly extending guides 52ª and 54ª which form extensions of guides 52 and 54 of the members 48 and 50. It may thus be appreciated that the carrier frame, by virtue of the slidable interfitting of the guides 52, 54, 52a, and 54a with the grooves 60 and 62 of the side frame members of the carrier, is laterally slidable through the machine to a position over a crate C disposed in the machine as shown in Fig. 2.

To move the carrier laterally as aforesaid a cylinder 74 is mounted on the cross-head by a pair of triangularly shaped brackets 76 and 78. A piston 80 operably received within the cylinder is coupled at its free end with a bracket 82, mounted on the side frame members 56 and 58 of the carrier as by the screws 84 and 86 received within the holes 88 and 90 of the side frame members. In a well known manner fluid pressure may be applied within the cylinder to reciprocate the piston. As the piston reciprocates the carrier is drawn from a position over the indexing station to a position within the cross-head and over a bottle crate C disposed in the machine.

Vertical reciprocation is imparted to the cross-head by a cylinder 92 mounted on the frame 37 of the machine, and a piston 94 operably received within the cylinder and coupled at its free end with cross-head as at 96. Fluid pressure applied to the cylinder in a well known manner serves to reciprocate the piston.

The crates are moved into the machine by a conveyor 98 more particularly described in our above-identified copending application. Mechanism 100, also more particularly described in said copending application, is adapted to engage a crate when it has reached a determined point of travel on the conveyor and withhold further movement of the crate and position it to receive bottles transferred from the indexing station by the carrier.

In general the crate positioning mechanism 100 comprises a fluid operated cylinder-piston combination 102, operably coupled with a pair of parallel crate elevating bars 104 and 106, spaced apart and disposed one on each side of the conveyor 98. Upon the actuation of the combination 102 the bars are elevated to raise a crate, disposed above the bars and on the conveyor, off the conveyor and into a bottle receiving position.

Such position is cooperatively determined by: the position of the crate during its travel on the conveyor at the instant fluid pressure is applied to the combination 102 to elevate the bars, the amount of elevation of the bars and the position of the arresting bracket 108 which is slidably adjustably mounted on the frame 37 by the slot 110 in the bracket and the screw 112 passing therethrough and threaded into the frame 37. The arresting bracket is adapted to engage the leading edge of the crate and hold the crate positioned on the elevating bars when they have raised the crate from the conveyor.

The carrier 42, which transfers the bottles from the indexing position to the awaiting crate, is constructed as shown in Figs. 4-12.

The bottles B shown in the figures are conventional milk bottles, generally square in cross section. The crates are conventional milk bottle crates having a cellular network of partitions 114 therewithin. The partitions or cells may be defined by strands of heavy wire crisscrossed as shown, or by sheet metal stampings. The cell walls may also be formed of wood, plastic, or the like. With the exception of wire strands, the other materials of which the partitions or cell walls are formed, present generally flat upper edges as at 116 and 118. Such edges have been found to be particularly troublesome when a crateload of bottles was attempted to be deposited in the crate because frequently the bases of the bottles would catch on the upper edges of the cell walls and prevent the introduction of the bottles into the cells.

As disclosed in our above-identified copending application, reject mechanism coupled with the elevating bars would be actuated to cause the carrier to return a crateload of bottles to the indexing station if the bottles would not be properly received within the cells. The reject mechanism was coupled with the elevating bars so that as a crateload of bottles descended toward the crate, if any of the bottles contacted an object in the crate which prevented the full introduction of the bottles within the cells, the crate and bars would be moved downwardly under the force of the carrier transmitted through the bottle which was not being properly received by the crate, and a trip switch was thereby actuated which caused the carrier to return the bottles to the indexing station.

It was found that the most frequent cause of bottles not being received by the crate was that the bases or floors of the bottles would catch on the upper edges 116 and 118 of the cell walls as the bottles were moved into the crate. Such catching of the bottles on the cell walls was due to misalignment of the bottles with the cells. The reasons for the misalignment may be better explained in connection with the structure of the carrier.

The carrier 42, which transfers the bottles from the indexing position to the awaiting crate, is constructed as shown in Figs. 4-12. Figs. 4, 5, and 9 show the side frame members 56 and 58 of the carrier connected at each end with the cross frames 120 and 122 by means of screws 124 extending through members 120 and 122 and threadedly received within blocks 126 mounted adjacent the ends of side frames 56 and 58.

The opposed faces of side frames 56 and 58 are provided with linearly extending grooves adapted to slidably receive a marginal edge of clamping bar supports 130 and 132. Another pair of clamping bar supports 134 and 136 are disposed between supports 130 and 132 and held in horizontal alignment with the latter by the cross members 138 and 140, through which pass the screws 142 fastening supports 130 and 136 to cross member or element 138, and fastening supports 134 and 132 to cross member or element 140.

Six laterally movable bottle gripping bars, or clamping bars, 144, 146, 148, 150, 152, and 154 arranged in cooperating bottle clamping pairs such as the pairs consisting of bars 144 and 146, 148 and 150, and 152 and 154, are coupled with the supports 130, 132, 134, and 136 to depend therefrom. Each bar is provided with a pair of brackets 153 and 155 which are fastened as by screws 156 to the supports. It now becomes apparent that upon movement of the cross members toward and away from each other the gripping bars of each pair, through the supports 130, 132, 134, and 136, will be similarly moved.

To effect such movement of the gripping bars, a fluid operated cylinder-piston combination 158 is coupled at one end to cross member 140 and at the other, or piston end, to cross member 138. Such coupling is effected through supporting blocks 160 and 162. The blocks are secured to the cylinder-piston combination in any convenient manner. Each block is secured to its respective cross member by a fixed pin 164 mounted on the cross member and extending through a hole 166 in the block. A screw 168, threadedly received within the cross member, extends through a hole 170 in the block, and is adapted to removably secure the block to the cross member.

It may be now appreciated that upon removal of screws 168 and screws 124, the cross frame 120 may be removed from the carrier and the cylinder-piston combination 158 may be lifted therefrom with the result that the gripping bars, supports therefor, and the cross members, may be slidably withdrawn from the carrier for repair or replacement with gripping bars dimensioned to grip bottles of another size or shape.

In our above-identified copending application the gripping bars of each pair of bars were recessed along their opposed faces at points spaced linearly of the bars. The bars were L-shaped in cross section with the foot of the L adapted to partially encircle a bottle neck disposed between the bars of each pair with the lip of the mouth of the bottle resting upon the upper edge of the feet of the L-shaped bars. With the bottles supported by catching the under edge of the lips of the mouth, they were free to swing beneath the carrier. Consequently, as the carrier moved laterally through the machine, stopped abruptly, and was then moved downwardly into the crate, the bottles swung somewhat beneath the carrier and frequently the floor or bottom wall of one or more of the bottles would catch on the upper edge of the cell walls and consequently not be placed in the cells of the crate.

The gripping bars disclosed herein obviate the above problem because they are adapted to grip the bottles in a positive manner and prevent any freely swinging movement. The bottle gripping portions of the bars are also shaped such that if the floor of the bottle engages the upper edge of a cell wall, with the resultant effect of the bottle being forced up against the gripping portions of the bars, the bottle will not jam between the gripping surfaces, as with the bars of our copending application, but rather will tend to pivot between the gripping surfaces so that the base of the bottle finds its way into its intended cell. The gripping portions of the bars are also so shaped that as the bars move to grip the bottles, the bottles are spaced apart at their necks the distance between adjacent cells of the crate to be filled, and as the carrier moves the bottles laterally through the machine toward the crate, the bases of the bottles move into alignment with the necks.

To accomplish these desirable results, the opposed faces of the gripping bars of each pair of bars are oppositely complementally arcuately recessed as at 172 and 174. The axes A of the arcuate recesses are spaced apart linearly of the bars a distance equaling the spacing between the axes $A_c$ of adjacent cells in a crate C. As shown in Fig. 11, when the bars are spaced apart, or are disposed in the bottle receiving position, and the indexing station is full of a crateload of bottles compacted together and arranged in rows, the axes A of the recesses are offset from the axes $A_b$ of the bottles.

As shown in Fig. 7, the wall of each recess is shaped to provide a vertically extending portion 176 which is spaced from the lip 178 of the bottle when the bars are in the bottle gripping position. Just below portions 176 the wall flares out defining a convex rib 180 which extends along the arcuate wall of the recess linearly of the bars, and terminates at the edges of the recess. This rib is shaped to conform to the curvature of the bottle neck both vertically and horizontally. It will be noted that the opposed ribs in each pair of opposed recesses, or cavities, are adapted to engage the bottles at their necks spaced just below the lips of the mouths. The opposed ribs cooperate to hold the bottles suspended beneath the carrier by their gripping action upon the necks. This gripping action is positive and of sufficient force, by virtue of the fluid cylinder-piston combination 158, that the bottles do not slip down between the bars so that the lips of the mouths of the bottles engage the ribs.

Figs. 7 and 13 show the bars in relation to the bottles before the bottles are gripped while Figs. 14, 15, and 12 show the relationship after the bottles have been gripped. Fig. 14 shows the bottles after they have been gripped but before the carrier has begun to move toward the awaiting crate. It will be remembered that the bottles disposed in the indexing station are compacted together because of the force exerted upon them by the bottles remaining on the conveyor 22. When the bottles are gripped by the bars they are spaced apart at their necks such that the distances between the axes $A_b$ of the bottles taken at their necks equals the distance between the axes $A_c$ of the cells of the crate to be filled. Because the bottles are held compacted together at their bases when gripped, only the upper portions of the bottles are spaced apart.

The bases of the bottles are held compacted together after the bottles have been gripped because of the bottle fence 182, generally illustrated in Fig. 3. The fence is coupled with the cylinder-piston combination 38 such that as combination 38 is actuated to cause the collecting table to drop away from the bottles supported by the carrier, the fence is elevated to prevent bottles on conveyor 22 from moving onto the collecting table while the carrier is depositing bottles in the crate. The fence is disposed to be elevated, as is more particularly described in our above identified co-pending application, between the leading row of bottles remaining on conveyor 22 and the adjacent row of bottles disposed on the collecting table. When the fence is elevated it holds the bottles on the table in compacted relationship at their bases. The compacted relation of the bases of the bottles and the spaced-apart relationship of the necks of the bottles after they have been gripped, accounts for the inclination of the bottles shown in Fig. 14.

The convex rib 180 of the gripping bars tends to urge the inclined bottles into a vertical position within the indexing station. As the carrier moves the bottles out of the station and away from the bottle fence, the bottles are permitted, under the urging of the bars, to be spaced apart throughout their heights, such that the distances between the axes $A_b$ of the bottles at their bases are equal to the distances between adjacent cells of the crate to be filled. Fig. 14 shows the spacing apart of the bottles at their bases just before they are deposited in the awaiting crate.

Because of the somewhat convex shape of the ribs 180 in cross section, and the fact that the ribs conform to the curvature of the bottle necks at the point of contact of the ribs with the bottles, plus the further fact that the lips of the mouths of the bottles are spaced above the ribs and from the walls of the recess of the bars, the gripping action of the bars is of a character such that the bottles may be pivoted slightly between the ribs. It is because the bottles may pivot slightly that upon contact of the base of a bottle with the upper surface of a cell wall in the crate, the bottle will pivot to find its way into the intended cell. While the bottle will not so pivot and find its way into the intended cell if the axis of the bottle is substantially offset from the axis of the intended cell, such pivoting will occur if the offset is slight, i.e., from ¼ of an inch or less.

The cylinder-piston combination 158, which is operable to move the bars, is so constructed that the piston does not reach the limit of its stroke when the bars are moved to the bottle gripping position. Consequently, the bars when moved into the bottle gripping or clamping position, shown in Figs. 7, 12, 13, and 14, are constantly being urged or tensioned toward the necks of the bottles. Such tensioning of the bars toward the bottle necks, plus the amount of surface contact between the ribs 180 and the bottle necks, prevent any freely swinging movement of the bottles, but yet permit slight pivoting of the bottles between the ribs if the base of a bottle contacts the upper edge of a cell wall as aforesaid. The spacing apart of the bottles from the position shown in Fig. 14 to the position shown in Fig. 15 is not accomplished through a free swinging of the bottles to a vertical position, but rather, by virtue of the tensioning of the bars toward each other and the desire of the bottles to fit between the ribs of the opposed recesses such that the necks of the bottles conform to the shape of the ribs complementing the shape of the bottle necks.

In spacing the necks of the bottles apart, the gripping bars impart movement to the bottle necks simultaneously in two directions, as indicated in Fig. 12 by arrows $La$ and $Li$. Arrow $Li$ indicates the spacing of the bottles linearly of the gripping bars or rows of bottles, and arrow $La$ indicates the spacing laterally of the rows or bars. The linear spacing of the bottles occurs through the coaction of the ribs of opposed recesses.

The linear spacings of the bottles from the position shown in Figs. 11 and 13 to the position shown in Figs. 12 and 14 occurs when the inner ends 186 of the ribs 180 in each pair of recesses contacts the necks of the bottles. The arcuate shape of the ribs urge the bottle necks linearly along the ribs and into the opposed recesses. The bottles disposed adjacent the ends of the bars move fatrher than the bottles disposed between them. When the necks of the bottles are fully moved into the recesses they are disposed as shown in Fig. 12.

Lateral spacing of the bottle necks occurs because as the upper and lower pairs of bars, as viewed in Fig. 11, moves to grip the rows of bottles disposed therebetween, the upper and lower rows are carried laterally away from the center row a distance such that the spacing between the axes of the bottles of adjacent rows taken at the bottle necks equals the spacing between axes of complementary rows of the crate.

Fig. 11 shows the bars in the bottle receiving position and with the distance D between the linear opposed faces of the bars of each pair exceeding the outside diameter of the bottle necks. Such spacing permits the rows of bottles to move onto the collecting table between the opposed bars of each pair.

In the operation of the machine, the bottles move into the indexing station 30 and fill the collecting table. They are compacted together and arranged in rows as they move into the station. When the leading bottles reach their limit of travel and the collecting table is full, a plurality of limit switches 184 are actuated which cause the cylinder-piston combination 158 to move the gripping bars which grip the bottles. Concurrently a succession of crates are moving into the machine on conveyor 98. The leading crate reaches a predetermined position and actuates a limit switch which causes the cylinder-piston combination to elevate the lifting bars 104 and 106 to raise the crate into the bottle receiving position.

When the crate has reached such position, and the carrier has gripped the bottles, an electric circuit is completed which causes the cylinder-piston combination 74 to move the carrier and bottles out of the indexing station and toward the awaiting crate. Cylinder-piston combination 92 is actuated when the carrier reaches a position aligned with the crate, and the carrier is thereupon moved toward the crate. The bottles enter the crate cells and a limit switch is tripped actuating the combination 158 to cause the gripping bars to release the bottles. Through suitable switches the carrier is then caused to return to the indexing station and the filled crate is fed out of the machine on conveyor 98. The circuit diagrams, function, and position of the various limit switches above mentioned, and the fluid lines leading to the cylinder-piston combinations are more specifically set forth in our above-identified copending application.

What we claim is:

1. That method of filling a cellular case with bottles comprising the steps of: arranging and compacting a caseload of upright bottles in a plurality of parallel rows corresponding in number to the number of rows of cells in the case to be filled with the bottles compacted together both longitudinally and transversely of the rows, positioning the cellular case to be filled in an upright position to receive the caseload of bottles, grippingly engaging the caseload of bottles as a group at their upper ends while simultaneously spacing them apart both longitudinally and laterally of the rows distances substantially equal to the spacing between the cells of the case, and lowering the bottles into the cells of the case, and releasing them in the cells.

2. That method of filling a cellular case with bottles comprising the steps of: arranging and compacting a caseload of upright bottles in a plurality of parallel rows corresponding in number to the number of rows of cells in the case to be filled with the bottles compacted together both longitudinally and transversely of the rows, positioning the cellular case to be filled in an upright position to receive the caseload of bottles, engaging the caseload of bottles as a group at their upper ends but with each bottle engaged individually for movement independent of the others for suspended transfer to the case, at the time of engaging the upper ends of the bottles, shifting such upper ends apart both longitudinally and laterally of the rows to space the bottles in two directions distances substantially equal to the spacing between the cells of the case, transferring the bottles into the cells of the case, and releasing them in the cells.

3. That method of filling a cellular case with bottles comprising the steps of: arranging and compacting a caseload of upright bottles in a plurality of parallel rows corresponding in number to the number of rows of cells in the case to be filled with the bottles compacted together both longitudinally and transversely of the rows, positioning the cellular case to be filled in an upright position to receive the caseload of bottles, engaging the caseload of bottles as a group at their upper ends but with each bottle engaged individually for movement independent of the others for suspended transfer to the case, at the time of engaging the upper ends of the bottles shifting such upper ends apart both longitudinally and laterally of the rows to space such upper ends of the bottles in two directions distances substantially equal to the spacing between the cells of the case, releasing the bottles of the engaged caseload of bottles from their compacted relationship at their lower ends and causing them to assume spaced-apart positions throughout their height corresponding to the spacing apart of the engaged upper ends of the bottles, transferring the bottles into the cells of the case, and releasing them in the cells.

4. That method of filling a cellular case with bottles comprising the steps of: moving a caseload of upright bottles arranged in a plurality of parallel rows, corresponding in number to the number of rows of cells in a case to be filled, into a bottle-indexing station; positioning a cellular case to be filled in an upright position to receive the caseload of bottles; spacing apart the bottles in the indexing station both longitudinally and laterally of the rows distances substantially equal to the spacing between the cells of the case; gripping the bottles at their upper ends for suspended transfer to the awaiting case; transferring the bottles so suspended into the cells of the case; and releasing the bottles in the cells.

5. The method defined in claim 4 characterized in that the caseload of bottles is supported from beneath while being moved into the indexing station, and while so supported in the station the bottles are engaged adjacent their upper ends for spacing apart both longitudinally and laterally of the rows, and said gripping of the bottles for suspended transfer occurs substantially simultaneously with said spacing apart of the bottles, and the supporting of the bottles from beneath is discontinued following spacing apart of the bottles adjacent their upper ends and gripping of the bottles for transfer.

References Cited in the file of this patent

UNITED STATES PATENTS

| | | |
|---|---|---|
| 2,358,447 | Creamer | Sept. 19, 1944 |
| 2,666,562 | Birch | Jan. 19, 1954 |
| 2,755,611 | McGihon | July 24, 1956 |
| 2,929,181 | Poupitch | Mar. 22, 1960 |